(12) United States Patent
    Monroe (10) Patent No.: US 10,940,544 B2
(45) Date of Patent: Mar. 9, 2021

(54) CENTERING GUIDE CAGE APPARATUS FOR INTERIOR WALL DRILLING

(71) Applicant: Samuel Earl Monroe, Sarasota, FL (US)

(72) Inventor: Samuel Earl Monroe, Sarasota, FL (US)

( * ) Notice: Subject to any disclaimer, the term of this patent is extended or adjusted under 35 U.S.C. 154(b) by 263 days.

(21) Appl. No.: 16/231,553

(22) Filed: Dec. 23, 2018

(65) Prior Publication Data

US 2019/0193170 A1    Jun. 27, 2019

Related U.S. Application Data

(60) Provisional application No. 62/609,505, filed on Dec. 22, 2017.

(51) Int. Cl.
| | | |
|---|---|---|
| *B23B 39/14* | (2006.01) | |
| *B23B 49/02* | (2006.01) | |
| *B23B 39/16* | (2006.01) | |
| *B23B 45/00* | (2006.01) | |

(52) U.S. Cl.
    CPC ............ *B23B 49/02* (2013.01); *B23B 39/166* (2013.01); *B23B 45/005* (2013.01); *B23B 2233/20* (2013.01); *B23B 2260/068* (2013.01)

(58) Field of Classification Search
    CPC ............... B23B 39/166; B23B 45/005; B23B 2260/068; B23B 2233/20; B23B 49/02; B23B 49/023; Y10T 408/5638; Y10T 408/564; Y10T 408/5653; Y10T 408/567; Y10T 408/568
    See application file for complete search history.

(56) References Cited

U.S. PATENT DOCUMENTS

| | | | | |
|---|---|---|---|---|
| 550,783 | A * | 12/1895 | Elliott | E21B 7/068 |
| | | | | 175/75 |
| 1,698,952 | A * | 1/1929 | Hoover | B25F 3/00 |
| | | | | 173/50 |
| 2,073,903 | A * | 3/1937 | O'Neil | B25B 23/00 |
| | | | | 81/436 |
| 2,501,217 | A * | 3/1950 | Hawn | F16C 1/04 |
| | | | | 464/114 |

(Continued)

FOREIGN PATENT DOCUMENTS

GB             189576 A  * 12/1922  ........... B23B 45/005

*Primary Examiner* — Alan Snyder
*Assistant Examiner* — Yasir A Diab (57) ABSTRACT

A centering guide cage apparatus for interior wall drilling includes a drill-bit holder, a flange bearing, a centering guide cage, a flexible casing, a hand-grip turnbuckle, and a flexible drill shaft. The centering guide cage, equipped with plurality of shape-memory supports, is terminally connected to an outer race of the flange bearing. The centering guide cage is terminally connected a distal end of the flexible casing from the opposite end. The hand-grip turnbuckle is terminally pressed against a proximal end of the flexible casing. A distal end of the flexible drill shaft is terminally connected to the drill-bit holder as the flexible drill shaft traverses through the flange bearing, the centering guide cage, the flexible casing, and the hand-grip turnbuckle. The flexible drill shaft is radially connected within an inner race of the flange bearing, wherein a proximal end of the flexible drill shaft is engaged with a drill driver.

12 Claims, 12 Drawing Sheets

(56) References Cited

U.S. PATENT DOCUMENTS

| | | | | |
|---|---|---|---|---|
| 2,747,384 | A * | 5/1956 | Beam | F16C 1/08 |
| | | | | 464/52 |
| 3,720,272 | A * | 3/1973 | Hunter | E21B 7/20 |
| | | | | 175/61 |
| 4,751,922 | A * | 6/1988 | DiPietropolo | B23Q 5/043 |
| | | | | 606/80 |
| 4,841,643 | A * | 6/1989 | Colella | B23D 51/02 |
| | | | | 30/393 |
| 5,185,934 | A * | 2/1993 | Tillman | B23D 49/162 |
| | | | | 30/371 |
| 5,395,188 | A * | 3/1995 | Bailey | B23B 47/28 |
| | | | | 408/127 |
| 5,455,997 | A * | 10/1995 | Nasiell | B25B 13/481 |
| | | | | 29/456 |
| 6,813,975 | B2 * | 11/2004 | Kozak | B25B 23/0021 |
| | | | | 81/177.6 |
| 7,861,802 | B2 * | 1/2011 | Underwood | E21B 7/04 |
| | | | | 175/76 |
| 2003/0155141 | A1 * | 8/2003 | Maras | B25F 3/00 |
| | | | | 173/29 |
| 2007/0053754 | A1 * | 3/2007 | Hartranft | B23B 45/005 |
| | | | | 408/127 |
| 2007/0264093 | A1 * | 11/2007 | White | B23B 51/126 |
| | | | | 408/127 |
| 2015/0273669 | A1 * | 10/2015 | Dougherty | B25B 23/0021 |
| | | | | 81/177.2 |

* cited by examiner

CENTERING GUIDE CAGE APPARATUS FOR INTERIOR WALL DRILLING

The current application claims a priority to the U.S. Provisional Patent application Ser. No. 62/609,505 filed on Dec. 22, 2017.

FIELD OF THE INVENTION

The present invention relates generally to a drilling tool. More specifically, the present invention is an interior wall drilling apparatus that utilizes a centering guide cage to prevent unintentional drilling of the drywall.

BACKGROUND OF THE INVENTION

When cables or electrical wires need to be run through a finished wall, it becomes difficult due to the enclosed space of the finished wall. Furthermore, additional structural members such as fire blocks, horizontal beam that runs between wall studs, can complicate the interior wall drilling. Generally, a hole is cut into the dry wall so that a long and flexible drill bit can be inserted into the wall through the hole. Then a drill driver is utilized to drill through fire blocks, ceiling joists, or floors. Then the cables or electrical wires can be pulled through the drilled hole. However, if the flexible drill bit is not centered, this process can create unintentional problems such as drilling through dry wall. Drywall repairs can require additional expenses and time as three or more trips are required to the work site until repairs can be totally completed (applying drywall joint compound and letting it dry, preparing the dry wall after joint compound is dried, matching wall texture or color, and painting).

It is an objective of the present invention to provide a centering guide cage apparatus for interior wall drilling. More specifically, the present invention utilizes a centering guide cage to properly place the drilling bit in the center of the drilling object as the centering guide cage is mechanically operated by the user. As a result, the present invention simplifies the drilling process within a finished wall without having to worry about the drill bit tracking, accidentally drilling through the drywall, or other outer surfaces that have to be repaired. The present invention is capable of drilling holes thru wood or metal horizontal supports or fire blockings within cavities of walls from 9/16" up to 6".

DETAIL DESCRIPTIONS OF THE INVENTION

All illustrations of the drawings are for the purpose of describing selected versions of the present invention and are not intended to limit the scope of the present invention.

The present invention is a centering guide cage apparatus for interior wall drilling. More specifically, the present invention utilizes a guide cage to properly place the drilling bit in the center of the drilling object. The present invention is then utilized to drill the desired surface area as the guide cage is mechanically operated by the user. As a result, the present invention simplifies the drilling process within a finished wall without having to worry about the drill bit tracking, accidentally drilling through the drywall, or other outer surfaces that have to be repaired.

The present invention comprises a drill-bit holder 1, a flange bearing 5, a centering guide cage 8, a flexible casing 16, a hand-grip turnbuckle 21, and a flexible drill shaft 25 as shown in FIG. 1-4. The centering guide cage 8 allows the present invention to be centrally positioned within the finished wall without obstructing the insertion of the present invention into the finished wall or removal of the present invention from the finished wall. In order to accomplish those tasks, the centering guide cage 8 comprises a first hub 9, a second hub 12, and a plurality of superelastic supports 15. In reference to the general configuration, the first hub 9 and the second hub 12 are hingedly connected to each other by the plurality of superelastic supports 15. The first hub 9 is terminally connected to an outer race 6 of the flange bearing 5 so that the flange bearing 5 can be connected to an upper end of the centering guide cage 8. The second hub 12 is terminally connected a distal end 17 of the flexible casing 16 so that a bottom end of the centering guide cage 8 can be connected to the flexible casing 16. The hand-grip turnbuckle 21 is terminally pressed against a proximal end 18 of the flexible casing 16 thus positioning the hand-grip turnbuckle 21 and the centering guide cage 8 at each ends of the flexible casing 16. Collectively, the flexible casing 16 and the hand-grip turnbuckle 21 operates the centering guide cage 8 in between an opened position and a closed position. When the present invention is operational, the outer race 6, the centering guide cage 8, the flexible casing 16, and the hand-grip turnbuckle 21 maintain a stationary positioning thus allowing the drill-bit holder 1 and the flexible drill shaft 25 to be rotated. More specifically, a distal end 26 of the flexible drill shaft 25 is terminally connected to the drill-bit holder 1. The flexible drill shaft 25 rotatably traverses through the flange bearing 5, the centering guide cage 8, the flexible casing 16, and the hand-grip turnbuckle 21. In order to retain the flexible drill shaft 25 within the present invention, the flexible drill shaft 25 is radially connected within an inner race 7 of the flange bearing 5. Resultantly, a proximal end 27 of the flexible drill shaft 25 can be removably engaged with a drill driver to rotate the flexible drill shaft 25 and the drill-bit holder 1.

The drill-bit holder 1 secures the desired drill bit that is utilized for the drilling process to the present invention. As a result, the present invention is able to interchange different drill bits to accommodate different diameter holes and different materials such as wood and aluminum. For example, a smaller drill bit is utilized within the drill-bit holder 1 to drill smaller holes that are sufficient to install electrical wires or cables. A larger drill bit is utilized within the drill-bit holder 1 to drill larger holes that are sufficient for plumbing piping. In reference to FIG. 5-10, the drill-bit holder 1 comprises a base 2, a lateral wall 3, an opening 4, and a locking mechanism 34. The lateral wall 3 is connected around the base 2, wherein the lateral wall 3 and the base 2 delineate the opening 4. The locking mechanism 34 is integrated onto the lateral wall 3 so that the unintentional dislodging of the desired drill bit can be eliminated. The opening 4 allows the desired drill bit to be inserted into the drill-bit holder 1 so that the desired drill bit can be placed. Then, the lateral wall 3, the base 2, and the locking mechanism 34 secure the desired drill bit within the present invention.

Figure 5:
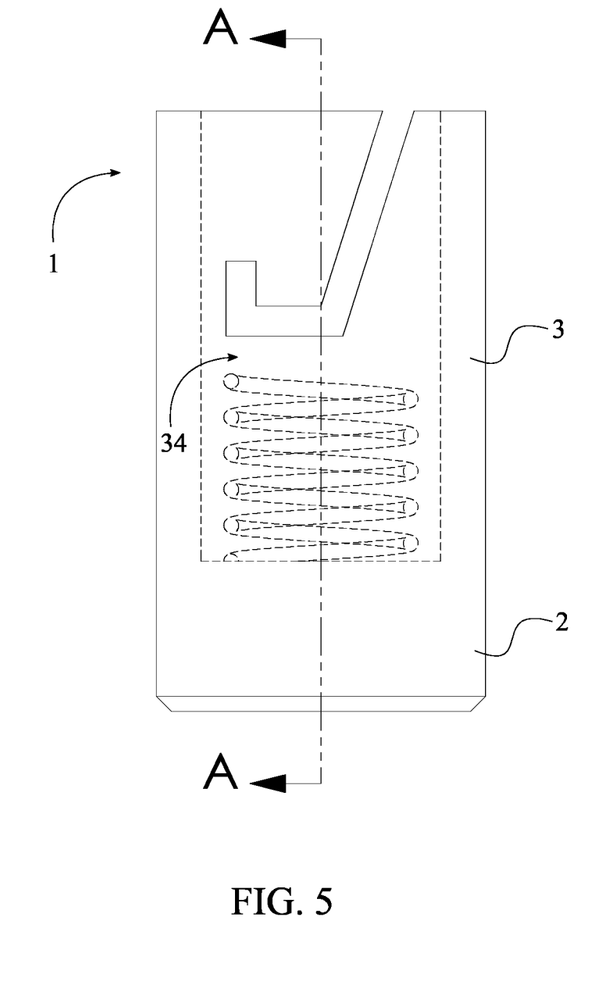
FIG. 5 is a side view of the drill-bit holder of the present invention, showing the plane upon which a cross sectional view is taken shown in FIG. 6.
Figure 6:
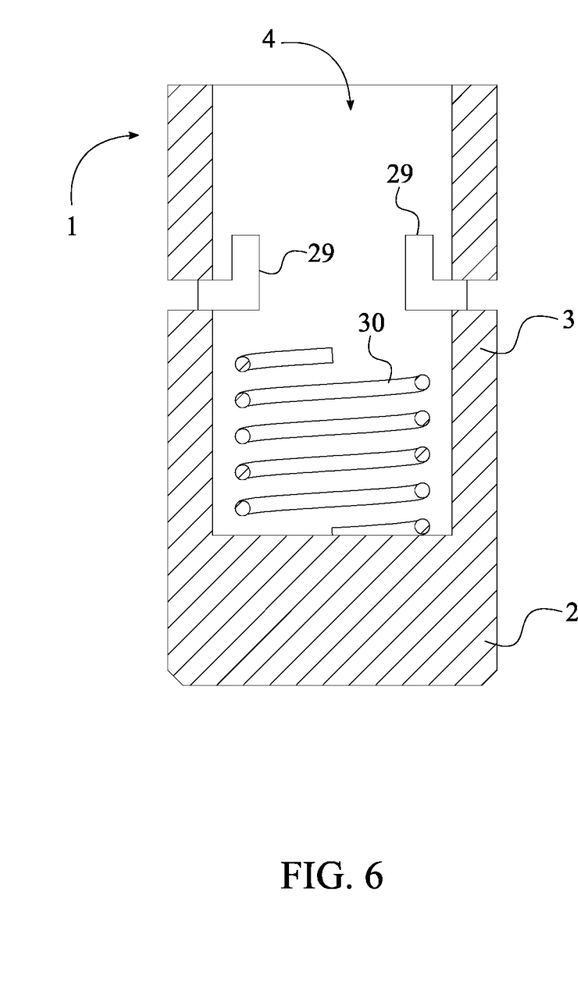
FIG. 6 is a cross section view of the drill-bit holder of the present invention taken along line A-A of FIG. 5, showing the first embodiment of the locking mechanism.

In reference to FIG. 5-6, a first embodiment of the locking mechanism 34 comprises a pair of drill-bit locking tracks 29 and a coil spring 30. More specifically, the coil spring 30 is terminally connected to the base 2 and concentrically positioned within the opening 4. The pair of drill-bit locking tracks 29 traverses through the lateral wall 3 and is positioned opposite of the base 2. When the desired drill bit is pushed into the opening 4, a pair of pins of a desired drill bit is inserted through an opened end of the pair of drill-bit locking tracks 29 as the desired drill bit pushes down on the coil spring 30. Then, the pair of pins is locked within a closed end of the pair of drill-bit locking tracks 29 due to the upward pressure of the coil spring 30 thus locking the desired drill bit.

Figure 7:
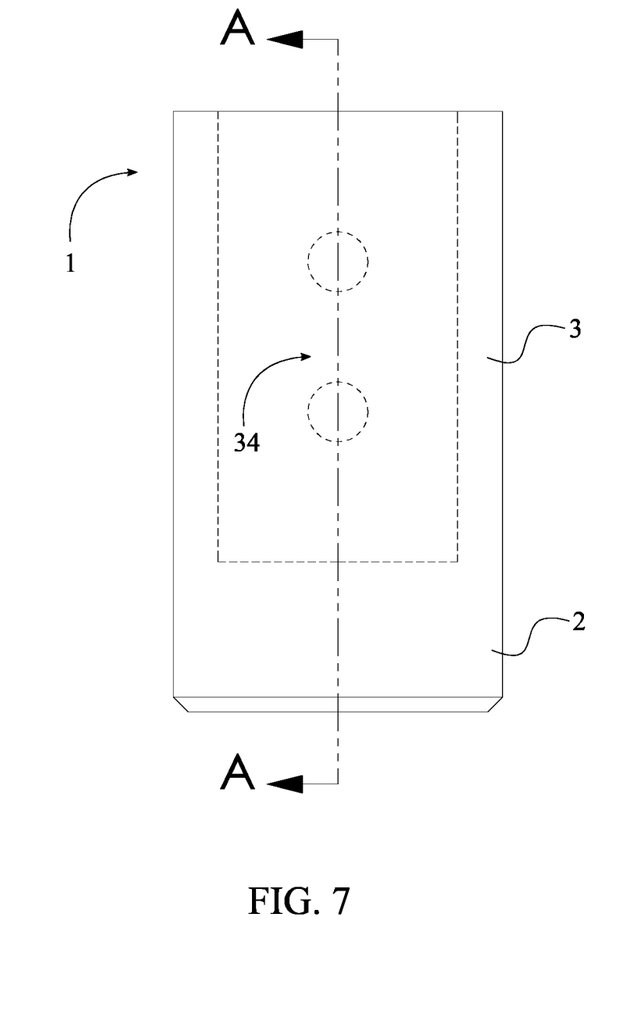
FIG. 7 is a side view of the drill-bit holder of the present invention, showing the plane upon which a cross sectional view is taken shown in FIG. 8.
Figure 8:
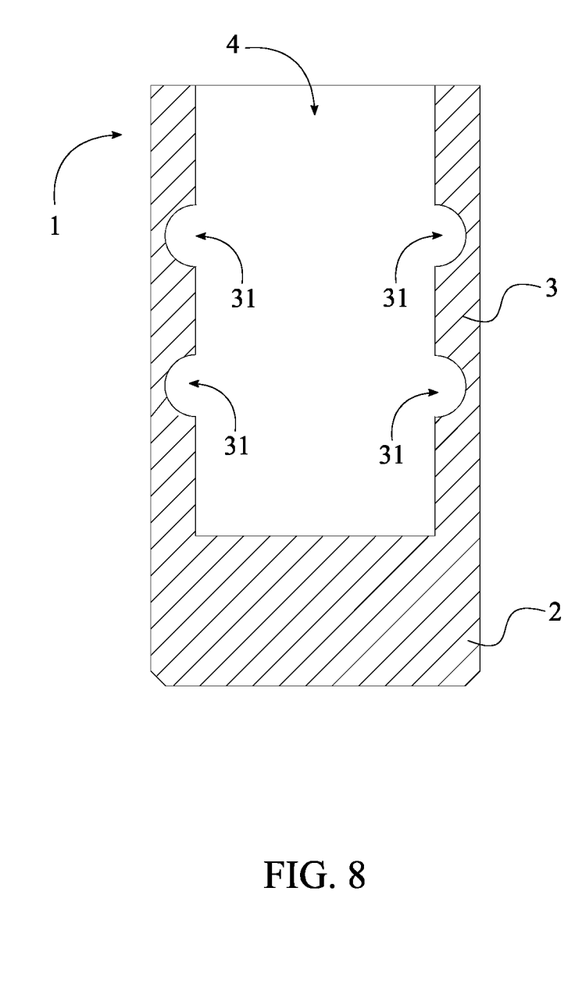
FIG. 8 is a cross section view of the drill-bit holder of the present invention taken along line A-A of FIG. 7, showing the second embodiments of the locking mechanism.

In reference to FIG. 7-8, a second embodiment of the locking mechanism 34 comprises at least one pair of cavities 31 that traverses into the lateral wall 3. Each hole of the at least one pair of cavities 31 is diametrically opposed of each other so that the at least one pair of cavities 31 can receive a pair of spring loaded balls of a desired drill bit. When the desired drill bit is pushed into the opening 4, a pair of spring loaded balls retracts inward and toward the desired drill bit. Then, the pair of spring loaded balls extends outward and into the at least one pair of cavities 31 due to the compression load of the at least one pair of spring loaded balls thus locking the desired drill bit.

Figure 9:
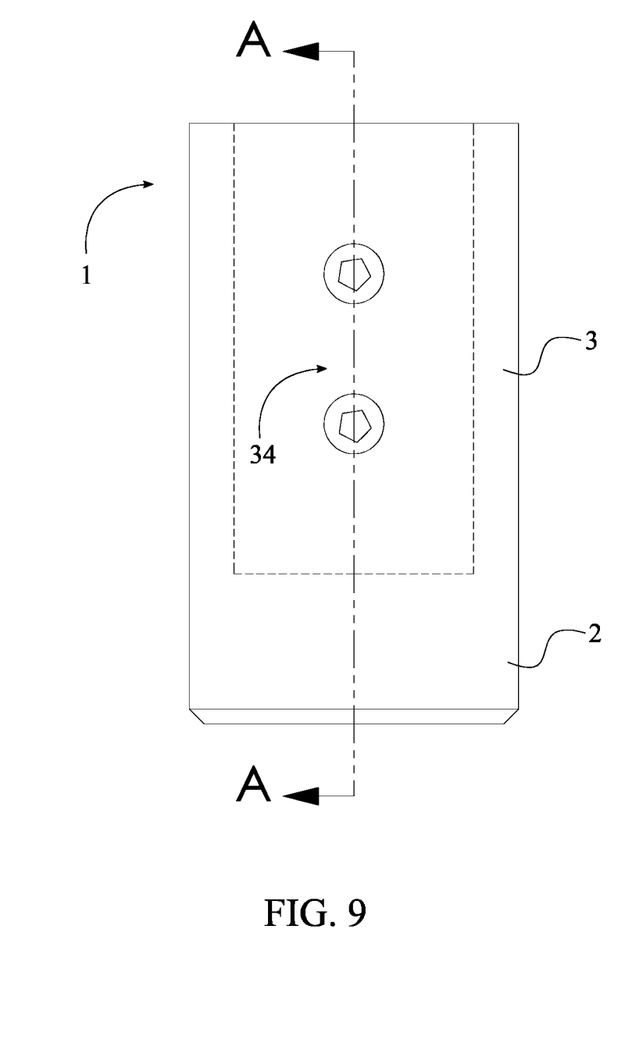
FIG. 9 is a side view of the drill-bit holder of the present invention, showing the plane upon which a cross sectional view is taken shown in FIG. 10.
Figure 10:
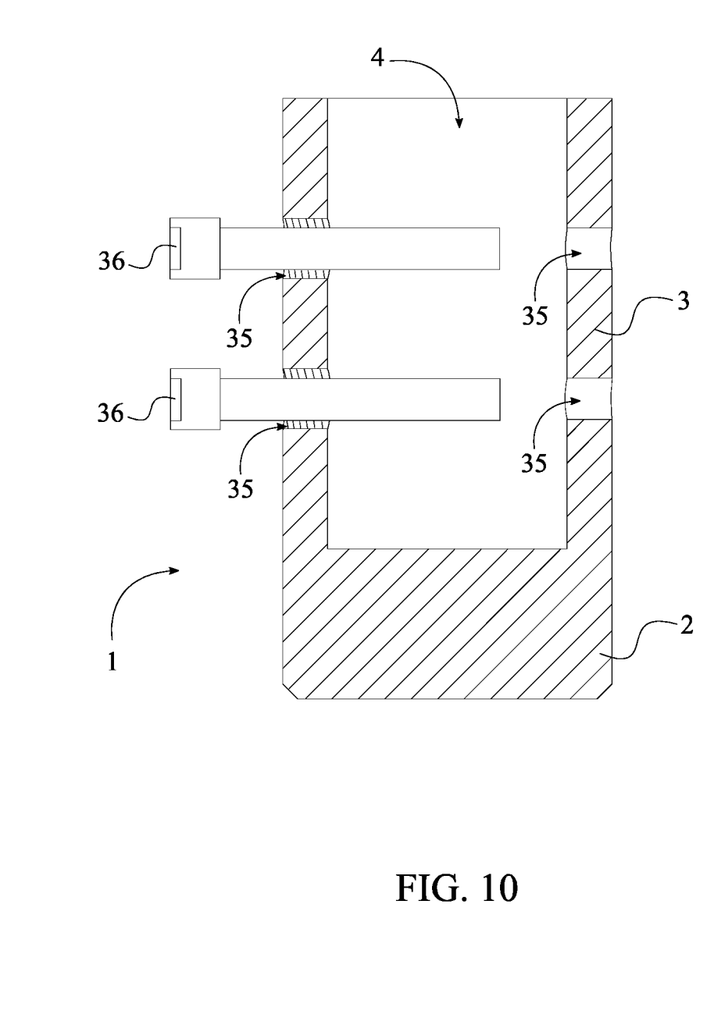
FIG. 10 is a cross section view of the drill-bit holder of the present invention taken along line A-A of FIG. 9, showing the third embodiments of the locking mechanism.

In reference to FIG. 9-10, a third embodiment of the locking mechanism 34 comprises at least one pair of holes 35 that traverses through the lateral wall 3 and at least one pin 36 that engages with the at least one holes 35. Each hole of the at least one pair of holes 35 is diametrically opposed of each other so that the at least one pair of holes 35 can receive at least one pin 36, preferably a set screw pin, to secure a desired drill bit. When the desired drill bit is pushed into the opening 4, a channel of the desired drill bit is concentrically aligned with the at least one pair of holes 35. Then, the at least one pin 36 traverses through the at least one pair of holes 35 and the channel and is threadedly engaged with the at least one pair of holes 35 thus locking the desired drill bit.

Figure 11:
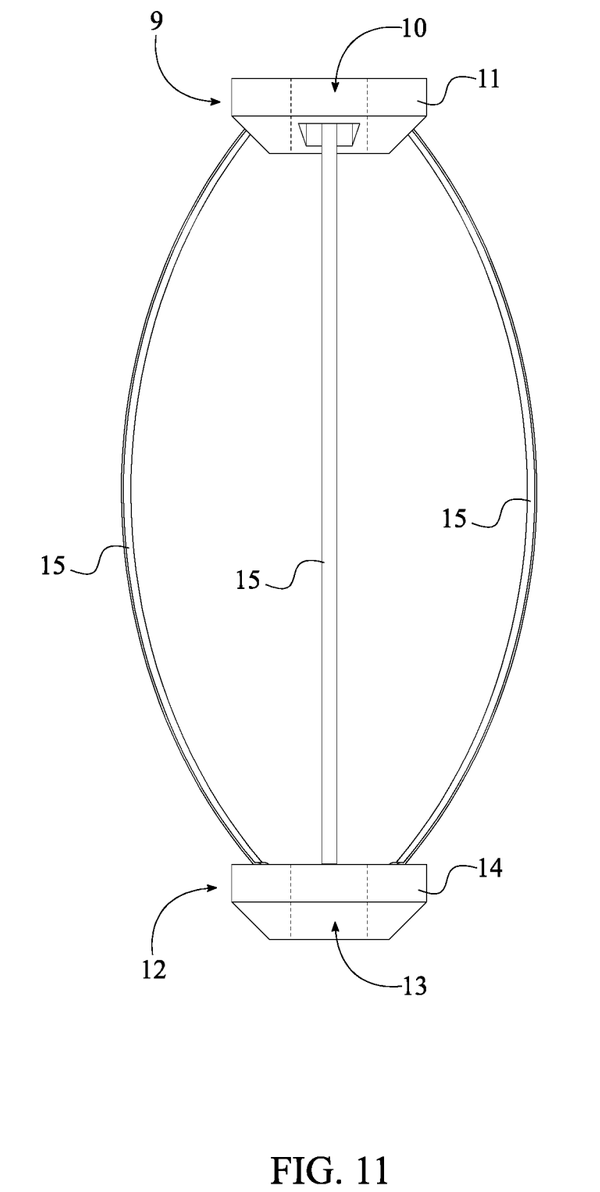
FIG. 11 is a side view of the centering guide cage of the present invention.

The first hub 9, which connects the centering guide cage 8 to the flange bearing 5, comprises a first central opening 10 and a first hub body 11 as shown in FIG. 11. The first hub body 11 is preferably shaped into a cylindrical body or a triangular body functions as the main structural body. The first central opening 10 concentrically traverses through the first hub body 11. The outer race 6 is radially connected to the first hub body 11 so that the flange bearing 5 can be connected to the centering guide cage 8 within the present invention. The inner race 7 is concentrically positioned with the first central opening 10 so that the flexible drill shaft 25 can be rotatably traversed through the first central opening 10.

The second hub 12, which connects the centering guide cage 8 to the flexible casing 16, comprises a second central opening 13 and a second hub body 14 as shown in FIG. 11. The second hub body 14 is preferably shaped into a cylindrical body or a triangular body functions as the main structural body. The second central opening 13 concentrically traverses through the second hub body 14. The distal end 17 of the flexible casing 16 is radially connected to the second hub body 14 so that the flexible casing 16 can be connected to the centering guide cage 8 within the present invention. The distal end 17 of the flexible casing 16 is concentrically positioned with the second central opening 13 so that the flexible drill shaft 25 can be rotatably traversed through the second central opening 13.

Figure 12:
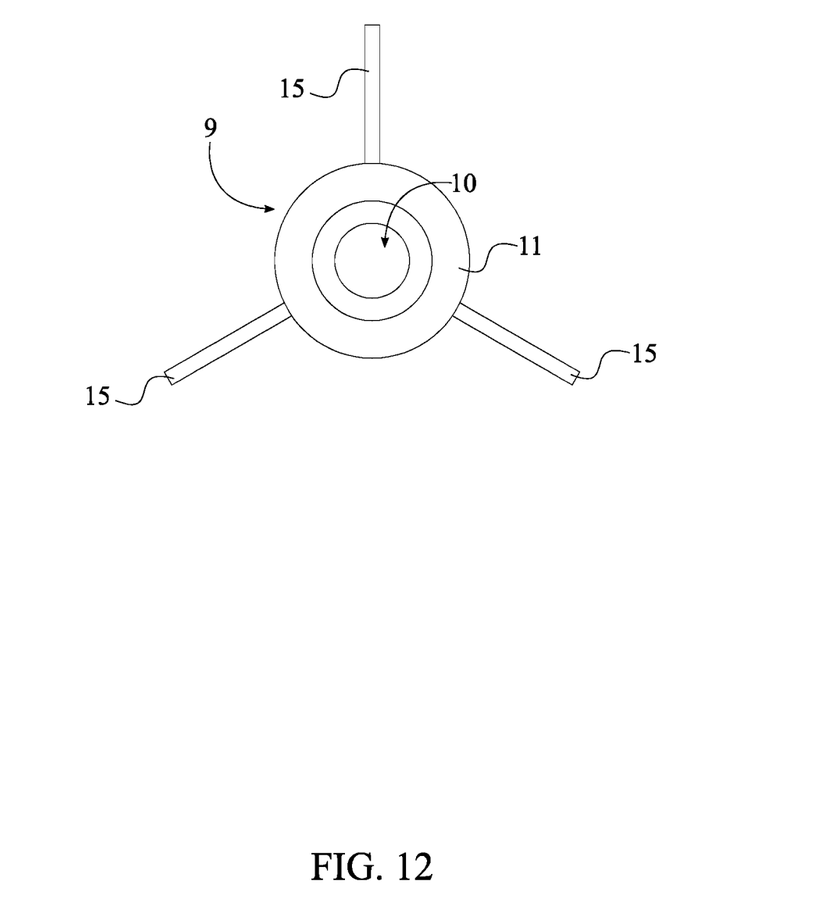
FIG. 12 is a top view of the centering guide cage of the present invention.

In reference to FIG. 12, the plurality of superelastic supports 15 is radially distributed around the first hub body 11 and hingedly connected to the first hub body 11, opposite of the outer race 6. In other words, the first hub body 11 is connected to the outer race 6 from one side and connected to the plurality of superelastic supports 15 from the opposite side. Similarly, the plurality of superelastic supports 15 is radially distributed around the second hub body 14 and hingedly connected to the second hub body 14, opposite of the distal end 17 of the flexible casing 16. In other words, the second hub body 14 is connected to the distal end 17 of the flexible casing 16 from one side and connected to the plurality of superelastic supports 15 from the opposite side. The hinged connection of the plurality of superelastic supports 15 allows the first hub 9 and the second hub 12 to move towards each other or pushed apart from each other during the operation of the present invention. When the first hub 9 and the second hub 12 move towards each other, the plurality of superelastic supports 15 elastically deforms into a curved profile which illustrates the opened position of the centering guide cage 8. When the first hub 9 and the second hub 12 move apart from each other, the plurality of superelastic supports 15 elastically deforms into a linear profile which illustrates the closed position of the centering guide cage 8. In the preferred embodiment of the present invention, the plurality of superelastic supports 15 is three supports. When the preferred embodiment is utilized within a finished wall, first support and second support rest on the first inner side of the finished wall and push out the centering guide cage 8 to the other side of the wall until the third support is in contact with the second inner side of the finished wall.

The plurality of superelastic supports 15 meets the requirement of a commercially available alloy know as NITINOL. This commercially available NITINOL alloy is rolled and heat treated to provide a support that is tempered with the grain of the metal in a longitudinal axis to enhance the shape memory characteristic of this metal, flexibility and shape memory being programmed into the support through chemistry and cold working. The resultant NITINOL support is highly resistant both to wear and to impact deformation. Each of the plurality of superelastic supports 15 comprises about 54.5 to 57% nickel, about 40 to 45% titanium, with other metals not exceeding about 5%.

Figure 13:
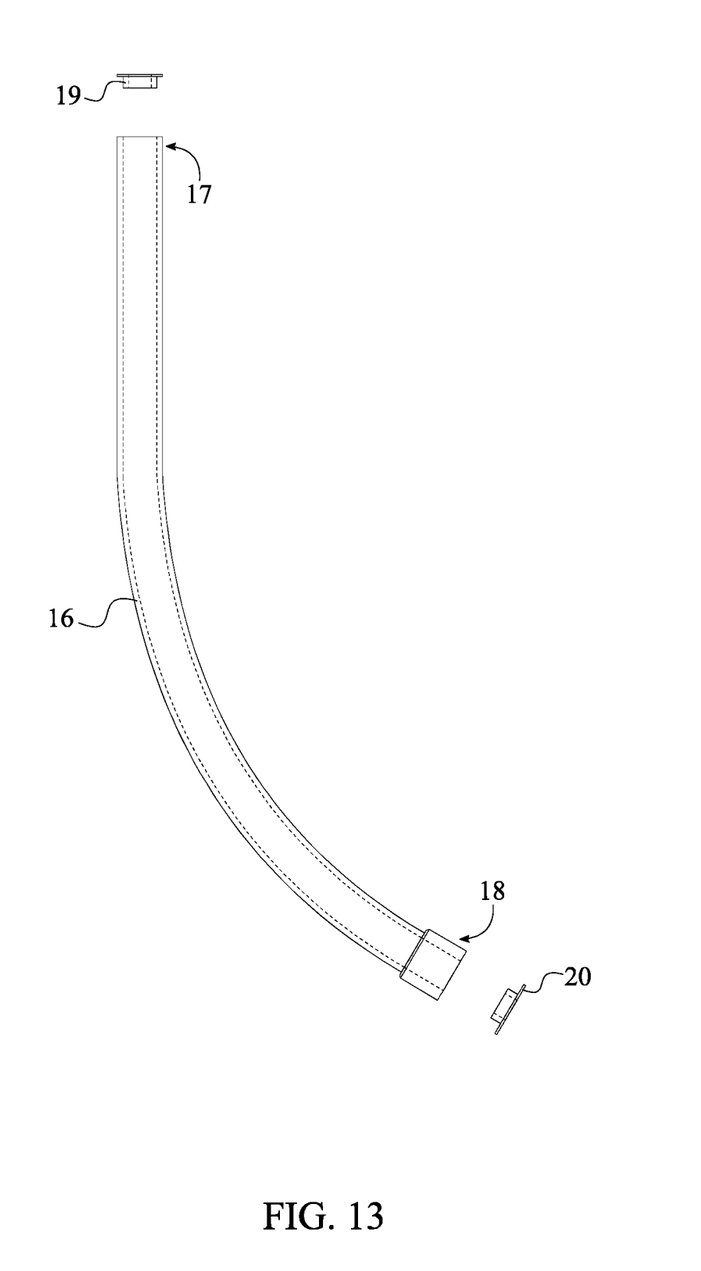
FIG. 13 is a side view of the flexible casing, the first slide bearing, and the second slide bearing of the present invention.

In reference to FIG. 13, the present invention further comprises a first slide bearing 19. The first slide bearing 19 is radially connected within the distal end 17 of the flexible casing 16 so that the flexible drill shaft 25 can rotatably traverse through the first slide bearing 19. In other words, the first slide bearing 19 allows the flexible drill shaft 25 to concentrically rotate within the flexible casing 16 so that the rotational friction between the flexible casing 16 and the flexible drill shaft 25 can be reduced with respect to the distal end 17 of the flexible casing 16.

In reference to FIG. 13, the present invention further comprises a second slide bearing 20. The second slide bearing 20 is radially connected within the proximal end 18 of the flexible casing 16 so that the flexible drill shaft 25 can rotatably traverse through the second slide bearing 20. In other words, the second slide bearing 20 allows the flexible drill shaft 25 to concentrically rotate within the flexible casing 16 so that the rotational friction between the flexible casing 16 and the flexible drill shaft 25 can be reduced with respect to the proximal end 18 of the flexible casing 16.

Figure 1:
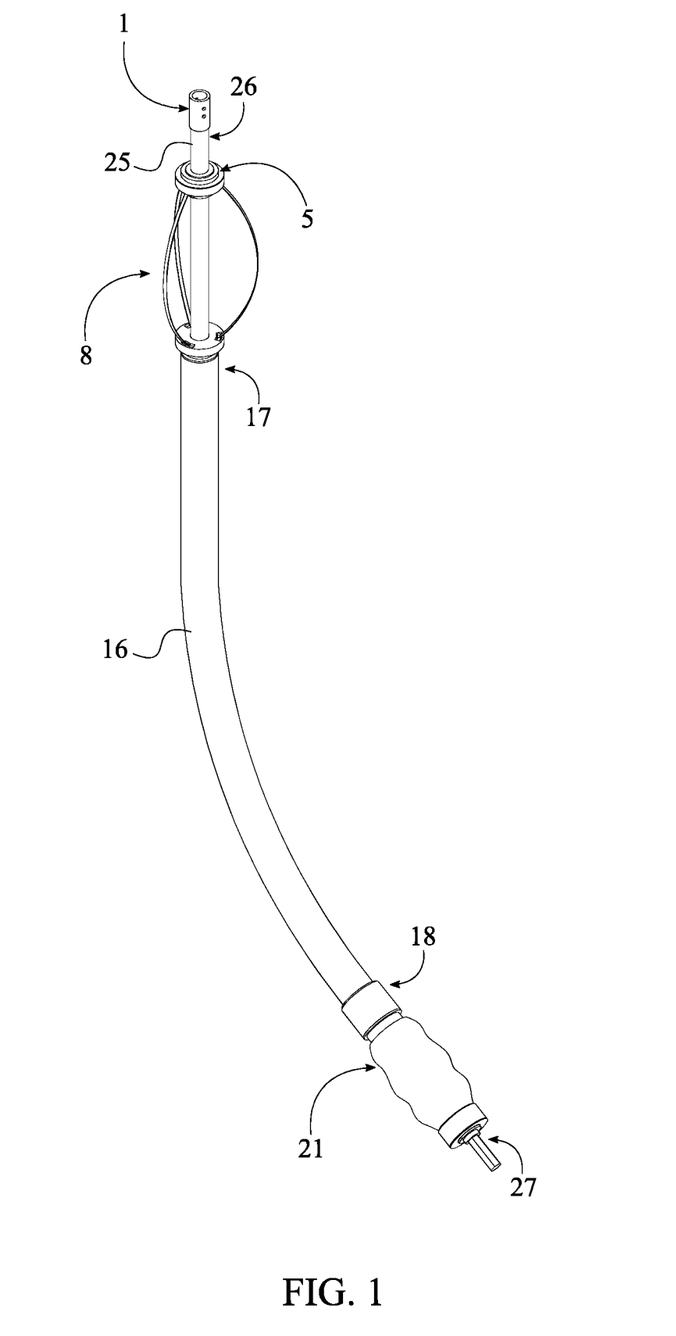
FIG. 1 is a perspective view of the present invention.
Figure 2:
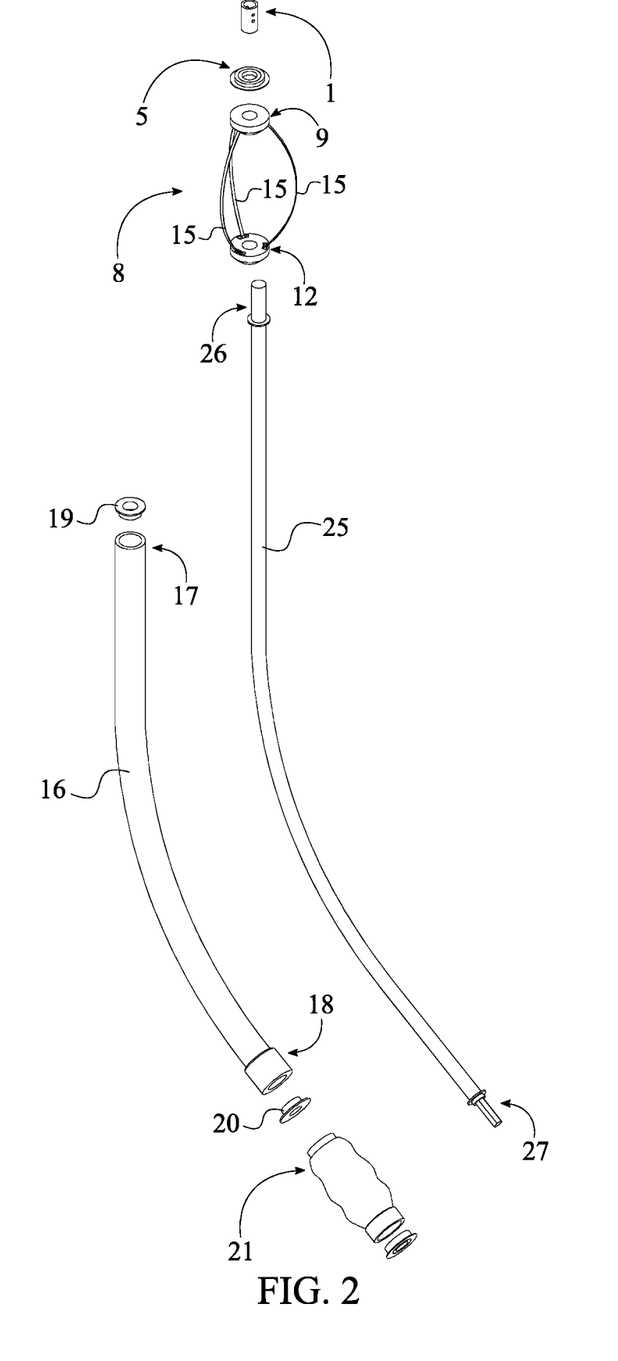
FIG. 2 is a perspective exploded view of the present invention.
Figure 3:
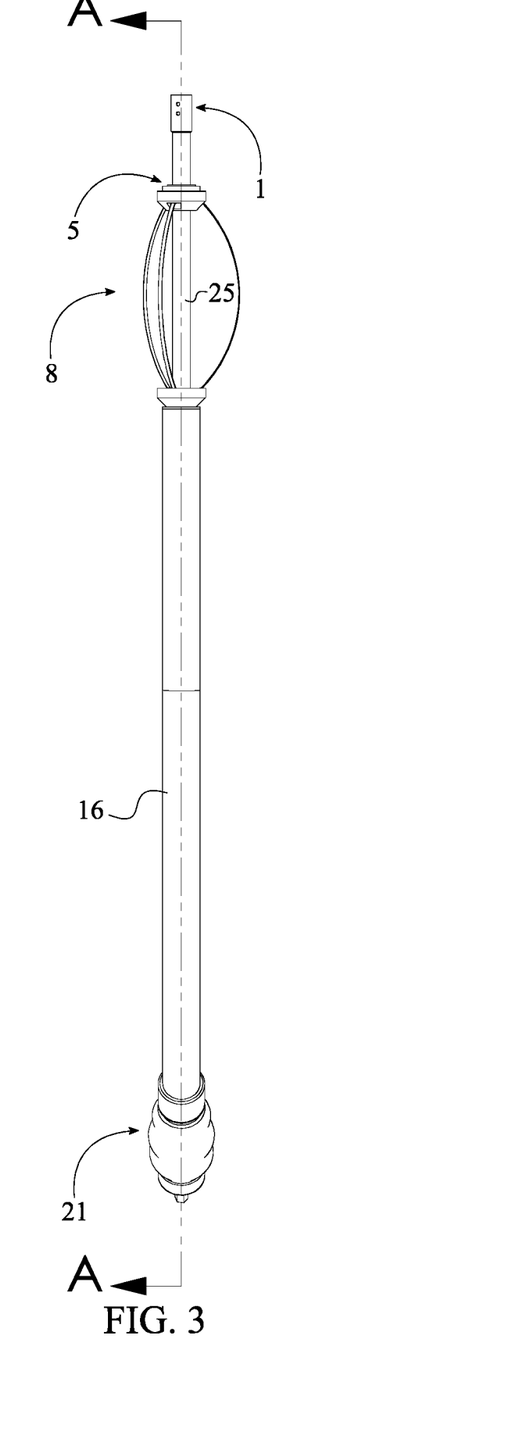
FIG. 3 is a side view of the present invention, showing the plane upon which a cross sectional view is taken shown in FIG. 4.
Figure 4:
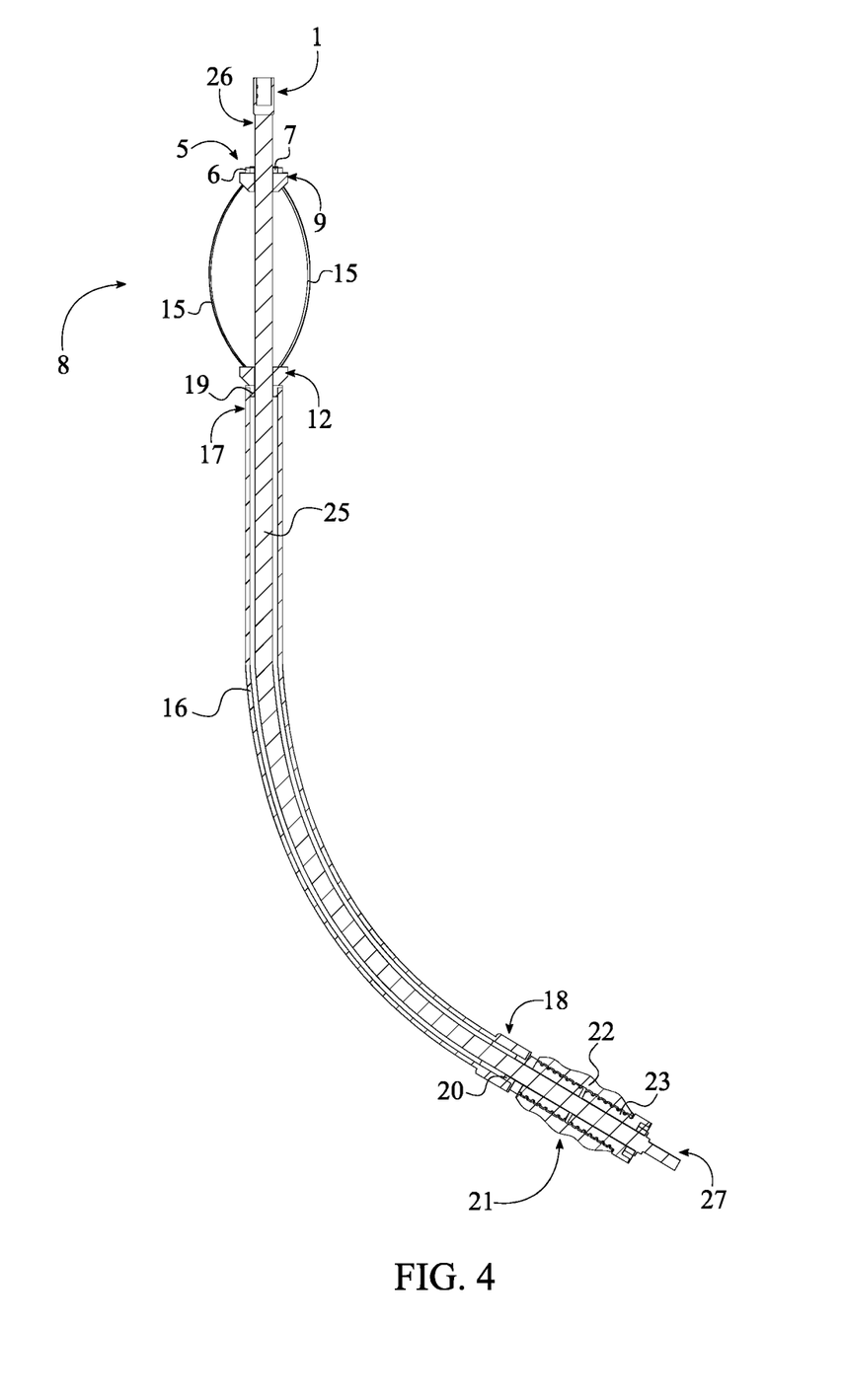
FIG. 4 is a cross section view of the present invention taken along line A-A of FIG. 3, showing the inner placement of the flexible drill shaft.

The hand-grip turnbuckle 21, which operates the centering guide cage 8 in between the opened position and the closed position, comprises an outer grip 22, at least one tubular adaptor 23, and a base 24 as shown in FIG. 4. The present invention can utilize a first and second embodiments of the hand-grip turnbuckle 21 to operate the centering guide cage 8.

Figure 15:
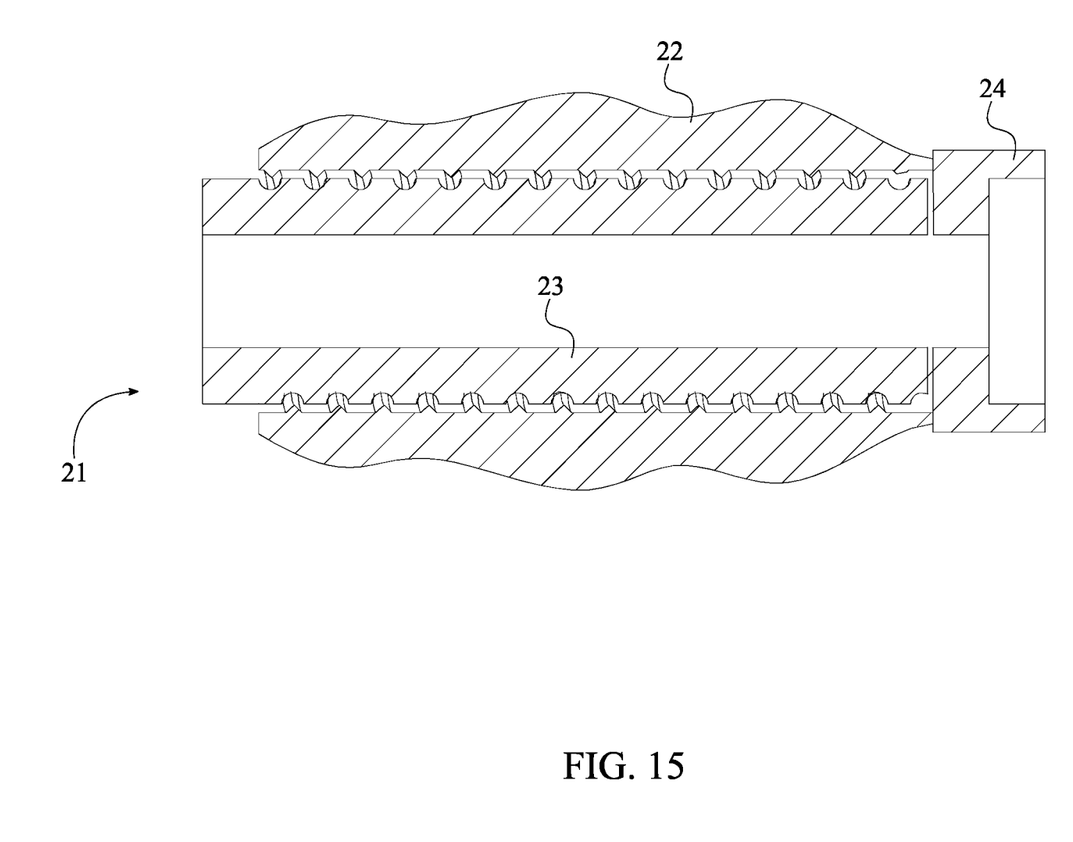
FIG. 15 is a cross sectional view for the first embodiment of the hand-grip turnbuckle of the present invention.

The first embodiment of the hand-grip turnbuckle 21 is shown in FIG. 15, wherein the at least one tubular adaptor 23 is a single adaptor. More specifically, the base 24 is terminally connected to the outer grip 22 so that the base 24 functions as a bearing housing and connect to the flexible drill shaft 25 to the present invention. The outer grip 22 is threadedly engaged with the at least one tubular adaptor 23 in such a way that the at least one tubular adaptor 23 is tensionably pressed against the distal end 17 of the flexible casing 16. As a result, clockwise rotation of the outer grip 22 radially moves the at least one tubular adaptor 23 towards the proximal end 18 of the flexible casing 16 thus converting the present invention from the closed position to the opened position. Counter-clockwise rotation of the outer grip 22 radially moves the at least one tubular adaptor 23 towards the base 24 thus converting the present invention from the opened position to the closed position. The flexible drill shaft 25 is rotatably traverses through the at least one tubular adaptor 23 and the base 24 so that the flexible drill shaft 25 can be connected within the base 24. More specifically, an outer race of a bearing is radially and concentrically connected within the base 24 so that an inner race of the bearing can allow the flexible drill shaft 25 to be traverses and connected.

Figure 14:
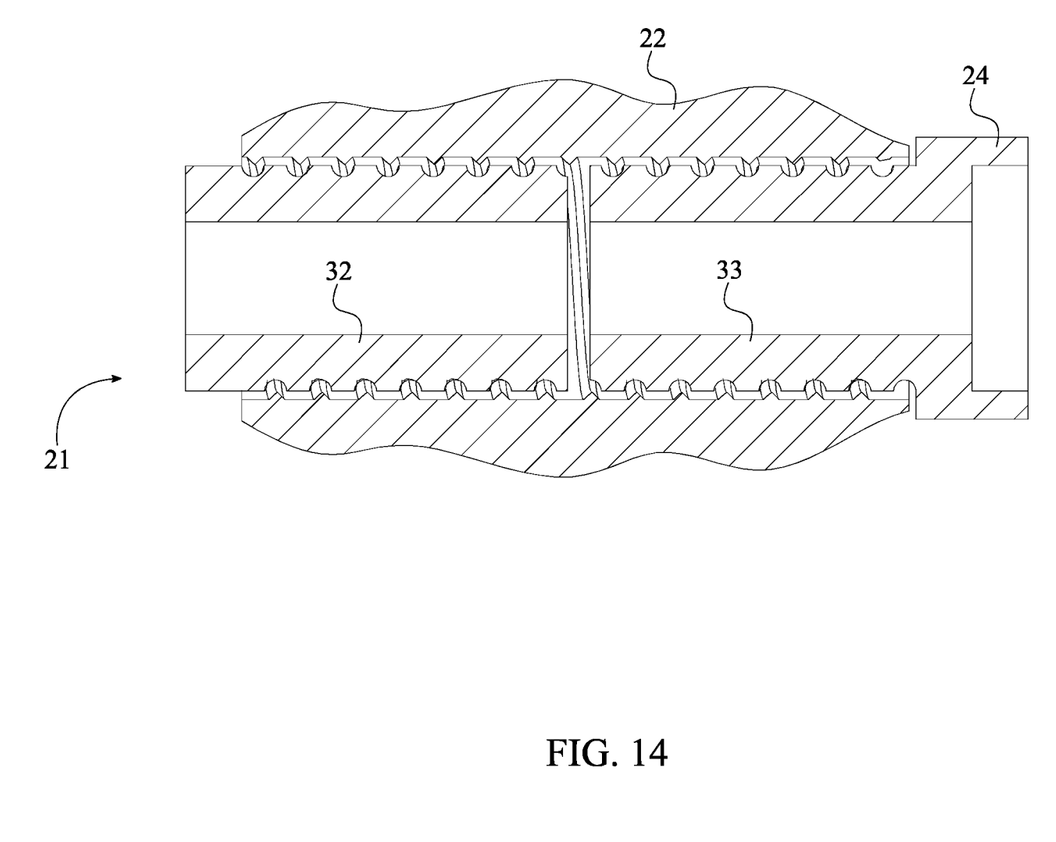
FIG. 14 is a cross sectional view for the second embodiment of the hand-grip turnbuckle of the present invention.

The second embodiment of the hand-grip turnbuckle 21 is shown in FIG. 14, wherein the at least one tubular adaptor 23 is two adaptors and comprises a first tubular adaptor 32 and a second tubular adaptor 33. More specifically, the base 24 terminally is connected to the first tubular adaptor 32 so that the base 24 functions as a bearing housing and connect to the flexible drill shaft 25 to the present invention. The outer grip 22 is threadedly engaged with the first tubular adaptor 32 and the second tubular adaptor 33 in such a way that the second tubular adaptor 33 is tensionably pressed against the distal end 17 of the flexible casing 16. As a result, clockwise rotation of the outer grip 22 radially moves the second tubular adaptor 33 and the outer grip 22 towards the proximal end 18 of the flexible casing 16 thus converting the present invention from the closed position to the opened position. Counter-clockwise rotation of the outer grip 22 radially moves the second tubular adaptor 33 and the outer grip 22 towards the base 24 thus converting the present invention from the opened position to the closed position. The flexible drill shaft 25 is rotatably traverses through the first tubular adaptor 32, the second tubular adaptor 33, and the base 24 so that the flexible drill shaft 25 can be connected within the base 24. More specifically, an outer race of a bearing is radially and concentrically connected within the base 24 so that an inner race of the bearing can allow the flexible drill shaft 25 to be traverses and connected. Additionally, a radial bearing and a slide bearing are concentrically connected within the first tubular adaptor 32 and the second tubular adaptor 33, respectively. The radial bearing and the slide bearing allow the flexible drill shaft 25 to be concentrically traverses within the first tubular adaptor 32 and the second tubular adaptor 33.

The present invention further comprises a first stopper and a second stopper. The first stopper is radially connected around the flexible drill shaft 25 and adjacently positioned to the inner race 7. Furthermore, the first stopper is positioned in between the inner race 7 and the drill-bit holder 1 so that the first stopper can apply downward pressure. The second stopper is radially connected around the flexible drill shaft 25 and adjacently positioned to the inner race of the bearing. Furthermore, the second stopper is positioned in between the inner race and the drill driver so that the second stopper can apply upward pressure. Resultantly, the first stopper and the second stopper are able to retain the flange bearing 5, the centering guide cage 8, the flexible casing 16, and the hand-grip turnbuckle 21 around the flexible drill shaft 25.

When a large window has been framed-in during a remodel, the user may need to install an electric outlet, a voice/data/tv/sound/audio-video outlet, or a water supply outlet toward the bottom of this wall section. By utilizing the present invention, users can drill right on up thru the bottom of the window, up through the double 2× header of window, then on up thru a 2× top plate of the wall. Then back pull a pull string while extracting the present invention.

Although the invention has been explained in relation to its preferred embodiment, it is to be understood that many other possible modifications and variations can be made without departing from the spirit and scope of the invention as hereinafter claimed.

What is claimed is:

1. A centering guide cage apparatus for interior wall drilling comprises:
   a drill-bit holder;
   a flange bearing;
   a centering guide cage;
   a flexible casing;
   a hand-grip turnbuckle;
   a flexible drill shaft;
   the centering guide cage comprises a first hub, a second hub, and a plurality of superelastic supports;
   the first hub and the second hub being hingedly connected to each other by the plurality of superelastic supports;
   the first hub being terminally connected to an outer race of the flange bearing;
   the second hub being terminally connected a distal end of the flexible casing;

the hand-grip turnbuckle being terminally pressed against a proximal end of the flexible casing;

a distal end of the flexible drill shaft being terminally connected to the drill-bit holder;

the flexible drill shaft traversing through the flange bearing, the centering guide cage, the flexible casing, and the hand-grip turnbuckle; and the flexible drill shaft being radially connected within an inner race of the flange bearing, wherein a proximal end of the flexible drill shaft is removably engaged with a drill driver.

2. The centering guide cage apparatus for interior wall drilling as claimed in claim 1 comprises:

the drill-bit holder comprises a base, a lateral wall, an opening, and a locking mechanism;

the lateral wall is connected around the base;

the opening is delineated by the lateral wall and the base; and the locking mechanism being integrated onto the lateral wall.

3. The centering guide cage apparatus for interior wall drilling as claimed in claim 2 comprises:

the locking mechanism comprises a pair of drill-bit locking tracks and a coil spring;

the coil spring is terminally connected to the base;

the coil spring is positioned within the opening; and the pair of drill-bit locking tracks traversing through the lateral wall, opposite of the base.

4. The centering guide cage apparatus for interior wall drilling as claimed in claim 2 comprises:

the locking mechanism comprises at least one pair of cavities; and the at least one pair of cavities traversing into the lateral wall.

5. The centering guide cage apparatus for interior wall drilling as claimed in claim 2 comprises:

the locking mechanism comprises at least one pair of holes and at least one pin;

the at least one pair of holes traversing through the lateral wall;

the at least one pin traversing through the at least one pair of holes; and the at least one pin being threadedly engaged with the at least one pair of holes.

6. The centering guide cage apparatus for interior wall drilling as claimed in claim 1 comprises:

the first hub comprises a first central opening and a first hub body the first central opening concentrically traversing through the first hub body;

the outer race being radially connected to the first hub body;

the plurality of superelastic supports being radially distributed around the first hub body;

the plurality of superelastic supports being hingedly connected to the first hub body, opposite of the outer race; and the flexible drill shaft rotatably traversing through the first central opening.

7. The centering guide cage apparatus for interior wall drilling as claimed in claim 1 comprises:

the second hub comprises a second central opening and a second hub body the second central opening concentrically traversing through the second hub body;

the plurality of superelastic supports being radially distributed around the second hub body;

the plurality of superelastic supports being hingedly connected to the second hub body, opposite of the distal end of the flexible casing; and the flexible drill shaft rotatably traversing through the second central opening.

8. The centering guide cage apparatus for interior wall drilling as claimed in claim 1, wherein each of the plurality of superelastic supports comprises about 54.5 to 57% nickel, about 40 to 45% titanium, with other metals not exceeding about 5%.

9. The centering guide cage apparatus for interior wall drilling as claimed in claim 1 comprises:

a first slide bearing;

the first slide bearing being radially connected within the distal end of the flexible casing; and the flexible drill shaft rotatably traversing through the first slide bearing.

10. The centering guide cage apparatus for interior wall drilling as claimed in claim 1 comprises:

a second slide bearing;

the second slide bearing being radially connected within the proximal end of the flexible casing; and the flexible drill shaft rotatably traversing through the second slide bearing.

11. The centering guide cage apparatus for interior wall drilling as claimed in claim 1 comprises:

the hand-grip turnbuckle comprises an outer grip, at least one tubular adaptor, and a base;

the at least one tubular adaptor being a first tubular adaptor and a second tubular adaptor;

the base being terminally connected to the first tubular adaptor;

the outer grip being threadedly engaged with the first tubular adaptor and the second tubular adaptor;

the second tubular adaptor being tensionably pressed against the distal end of the flexible casing;

the flexible drill shaft being rotatably traversing through the first tubular adaptor, the second tubular adaptor, and the base; and the flexible drill shaft being radially connected within the base.

12. The centering guide cage apparatus for interior wall drilling as claimed in claim 1 comprises:

the hand-grip turnbuckle comprises an outer grip, at least one tubular adaptor, and a base;

the base being terminally connected to the outer grip;

the outer grip being threadedly engaged with the at least one tubular adaptor;

the at least one tubular adaptor being tensionably pressed against the distal end of the flexible casing, opposite of the base;

the flexible drill shaft being rotatably traversing through the at least one tubular adaptor and the base; and the flexible drill shaft being radially connected within the base.

* * * * *